S. C. HIRSCHBERG.
SPECTACLE OR EYEGLASS CASE.
APPLICATION FILED OCT. 7, 1910.

1,024,005.

Patented Apr. 23, 1912.

WITNESSES:
G. V. Rasmussen
Elmer S. Willyoung

INVENTOR
SOLOMON C. HIRSCHBERG
BY Arthur v. Briesen
Briesen & Knauth
ATTORNEYS

UNITED STATES PATENT OFFICE.

SOLOMON C. HIRSCHBERG, OF NEW YORK, N. Y.

SPECTACLE OR EYEGLASS CASE.

1,024,005.

Specification of Letters Patent. Patented Apr. 23, 1912.

Application filed October 7, 1910. Serial No. 585,736.

*To all whom it may concern:*

Be it known that I, SOLOMON C. HIRSCHBERG, a citizen of the United States, and resident of the borough of Manhattan, city, county, and State of New York, have invented certain new and useful Improvements in Spectacle or Eyeglass Cases, of which the following is a specification.

My invention relates to pocket cases intended for the holding of spectacles and eyeglasses when not in actual use and has for its object to provide such a case with means for securely and conveniently holding a piece of cleaning fabric or the equivalent, so that said spectacles or eye glasses may have their lenses quickly and efficiently cleaned.

Eyeglasses and spectacles are easily soiled in use, by dust which settles on them from the atmosphere, particularly if the atmosphere is moist; by the fingers which may accidentally touch the lenses in placing them on or removing them from the person; by being laid upon a dusty table or desk, and in numerous other ways. It is customary for most users of spectacles and eyeglasses to employ a handkerchief or a portion of any convenient garment to remove such dirt from the lenses, but this practice is not only ineffective but is often very rapidly destructive of the optical qualities of the lenses which require to be maintained at a high polish. The average handkerchief, garment or other conveniently accessible fabric generally holds a great deal of dust even though apparently clean; it is also liable to be more or less greasy. When such a fabric is used in cleaning the lens, the dust serves as an abrading medium to destroy the polish of said lenses while the grease is transferred from the fabric to the lenses and acts obstructively on light rays passing through them. To avoid the above difficulties a specially selected fabric, preferably free from wool, should be used and should be kept rigorously clean.

In my invention I so arrange the spectacle case that a suitable fabric is contained in the case ready for instant use, firmly held so that it can only be removed from the case intentionally and, furthermore, held in such a way as not to interfere with the removal of the spectacles or eyeglasses from the case on their replacement.

My invention will be better understood by reference to the drawings in which—

Figure 3:
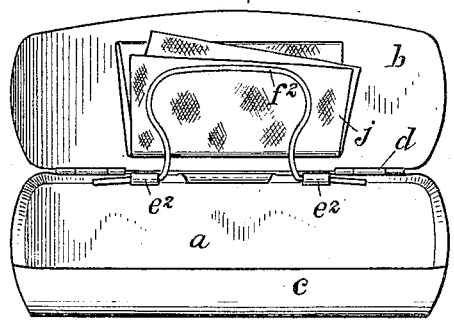
Figure 2:
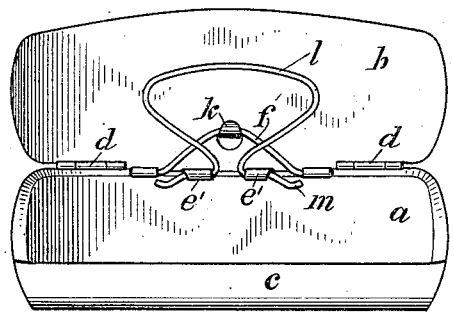
Figure 1:
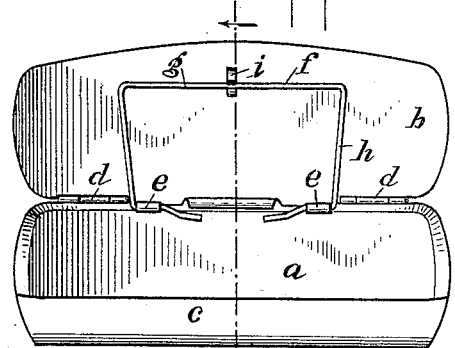
Figure 4:
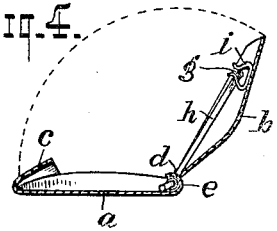

Figure 1 represents a preferred form of my invention as applied to a spectacle case; Fig. 2 represents a similar view of a spectacle case provided with a modification of my invention; Fig. 3 represents still another modification of my invention; and Fig. 4 is a section along the line 4—4 of Fig. 1.

Referring to the drawings, Fig. 1 shows a spectacle case of usual pattern comprising a base $a$ and lid $b$; the front $c$ of the former being turned inwardly toward the back so as to provide an angle within which the spectacles may be slipped and over which the lid $b$ hinged to the base at $d$ may be opened and shut. A little below the line of the hinges $d$ are two symmetrically arranged knuckles $e$ into which are inserted the ends of a spring $f$ comprising a straight portion $g$ parallel with the length of the case and connecting portions $h$ joining the part $g$ to the ends. The spring is held at the center of the straight portion $g$ against the back $b$ by a spring clip $i$ fixed to said back. As thus described the spring $f$ serves to hold the lid fully open or fully shut by reason of the fact that in either of these positions the distance between the axis of the knuckles $e$ and the line of the spring portion $g$ is less than at an intermediate position between open and shut. This general arrangement of spring with reference to spectacle cases for the purpose pointed out is well known in the art.

The clip $i$ which holds the spring $f$ is so adjusted that ordinarily the spring will be firmly held by it so that the lid may be opened and shut in the usual way and the case is to all intents and purposes the well known case of the art. By grasping the spring $f$ and lid $b$ however, the two may readily be pulled apart and the selected fabric $j$ (shown only in Fig. 3) placed between the spring and the lid removed or replaced. Ordinarily, therefore, when the case is opened the lid will fly back to the fully open position as soon as it is pressed a short distance from the base. The glasses may then be removed, the spring $f$ pulled away from the lid the fabric $j$ taken out and used to clean the glasses and then replaced and the spring $f$ forced down into the clips after which the case may be snapped shut.

In Fig. 2 the spring $f'$ is permanently attached to the lid $b$ at $k$; although of a different configuration than the spring $f$ of Fig. 1 it is connected to the case in exactly the same way and operates according to the same principle to hold the lid of the case fully open or shut as the case may be. This arrangement of the case and spring is in fact, well known in the art. I apply my invention to this style of case by adding extra knuckles $e'$ in or near the line of the hinges $d'$ and fitting into these knuckles the ends of the spring $l$ which has otherwise no connection whatever with either lid or base. By suitably shaping the ends $m$ this spring, like spring $f$ (Fig. 1) tends either to assume a position against the base or against the fully opened lid. When the lid is closed it is held closed by the spring $f'$, which same spring also tends to hold the lid fully open when the same has been thrown up. If a piece of fabric be placed against the inside of the lid and spring $l$ be thrown up when the lid is open, the fabric will be firmly held between the spring and the lid and when the lid is closed down will continue to be so held; but when the lid is raised spring $l$ will remain behind in the base $a$, thus leaving the fabric free to be used.

In Fig. 3 there is no spring provided for keeping the lid open or closed, but by suitably constructing the case sufficient friction may be introduced into the hinges to accomplish this purpose. Spring $f^2$ is arranged in the same manner as is the spring $l$ in Fig. 2 and tends to remain either in the base or, if thrown up beyond a certain distance, against the inside of the lid $b$ when fully opened. The fabric, as in the case of Fig. 2 is held between the lid $b$ and spring $f^2$. This structure is indeed exactly the same as that shown in Fig. 2 except that the case spring proper $f'$ is omitted.

Variations of detail may be made without departing from the spirit of my invention. I do not confine myself to any particular type of spectacle case, nor to any particular configuration or method of attaching and operating the fabric-holding springs, which may be varied quite widely, but

I claim:

1. In combination with a spectacle or eyeglass case having a base and a lid hinged together, a spring within said case having portions pivotally engaging said case and provided also with clamping portions, and means for holding, when the case is open, said clamping portions either within said base or adjacent to the inside of said lid, substantially as and for the purpose described.

2. In combination with a spectacle or eyeglass case having a base and a lid hinged together, a spring within said case having portions pivotally engaging knuckles fixed to the case and provided also with clamping portions, and means for holding, when the case is open, said clamping portions either within the base or adjacent the inside of the lid, substantially as and for the purpose described.

3. In combination with a spectacle or eyeglass case having a base and a lid hinged together, a spring within said case having portions pivotally engaged with said case and provided also with clamping portions, means for pressing said clamping portions, when the case is open, either downwardly into the base or outwardly against the lid, and independent means for positively but detachably holding said clamping portions against said lid, substantially as and for the purpose described.

4. In combination with a spectacle or eyeglass case having a base and a lid hinged together, a spring within said case having portions pivotally engaged with said case and provided also with clamping portions, means for pressing said clamping portions, when the case is open, either downwardly into the base or outwardly against the lid, and a clip fixed to said lid for positively but detachably holding said clamping portions against said lid, substantially as and for the purpose described.

In testimony whereof I have hereunto set my hand in the presence of two subscribing witnesses.

SOLOMON C. HIRSCHBERG.

Witnesses:
W. H. RUBY,
D. J. BURKE.

Copies of this patent may be obtained for five cents each, by addressing the "Commissioner of Patents, Washington, D. C."